(12) United States Patent
Shroff et al.

(10) Patent No.: US 8,756,559 B2
(45) Date of Patent: Jun. 17, 2014

(54) SYSTEMS AND METHODS FOR DETERMINING AGING DAMAGE FOR SEMICONDUCTOR DEVICES

(71) Applicants: Mehul D. Shroff, Austin, TX (US); Peter P. Abramowitz, Austin, TX (US)

(72) Inventors: Mehul D. Shroff, Austin, TX (US); Peter P. Abramowitz, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 13/665,256

(22) Filed: Oct. 31, 2012

(65) Prior Publication Data
US 2014/0123085 A1 May 1, 2014

(51) Int. Cl.
*G06F 17/50* (2006.01)

(52) U.S. Cl.
USPC .......................................... 716/136; 716/106

(58) Field of Classification Search
USPC .................................................. 716/106, 136
See application file for complete search history.

(56) References Cited

U.S. PATENT DOCUMENTS

| | | | |
|---|---|---|---|
| 6,634,015 B2 * | 10/2003 | Lee et al. | 716/108 |
| 7,292,968 B2 | 11/2007 | Wu et al. | |
| 7,567,891 B1 | 7/2009 | Liu et al. | |
| 7,835,890 B2 | 11/2010 | Wu et al. | |
| 8,099,269 B2 | 1/2012 | Topaloglu et al. | |
| 2006/0267621 A1* | 11/2006 | Harris et al. | 324/765 |
| 2011/0313735 A1 | 12/2011 | Lo et al. | |

OTHER PUBLICATIONS

Shailesh More, "Aging Degradation and Countermeasures in Deep-submicrometer Analog and Mixed Signal Integrated Circuits", Theis from University Munchen, pp. 1-27, Nov. 24, 2011.*
Mentor Graphics, "Eldo UDRM User's Manual, Release AMS 11.2", 2003-2012.
Ma, J., "MOSFET HCI/NBTI AgeMOS Reliability Modeling Practices", ProPlus Design Solutions, Inc., pp. 1-37, HCI/NBTI Effects under AC Operation, p. 7.
Cadence, "Virtuoso RelXpert Reliability Simulator User Guide", Product Version 11.1, Sep. 2011.
Tudor, B., et al., "An Accurate and Scalable MOSFET Aging Model for Circuit Simulation", IEEE, 12th Int'l Symposium on Quality Electronic Design, 2011, pp. 448-451.

* cited by examiner

*Primary Examiner* — Vuthe Siek
(74) *Attorney, Agent, or Firm* — Mary Jo Bertani; James L. Clingan, Jr.

(57) ABSTRACT

A method includes generating a circuit design and executing a simulation of the circuit design at a plurality of time slices. Type 1 damage and type 2 damage are determined for each time slice. A total type 1 damage is provided as a sum of the type 1 damage for all of the slices in which type 1 damage is greater than type 2 damage. A total type 2 damage is similarly added for the slices where the type 2 damage is dominant. A type 1 aging effect is determined based on the total type 1 damage. A type 2 aging effect is determined based on the total type 2 damage. The type 1 aging effect is added to the type 2 aging effect to obtain a total aging effect. The circuit design is tested using the total aging effect to determine if the circuit design provides adequate lifetime performance.

18 Claims, 5 Drawing Sheets

SYSTEMS AND METHODS FOR DETERMINING AGING DAMAGE FOR SEMICONDUCTOR DEVICES

BACKGROUND

1. Field

This disclosure relates generally to semiconductor devices, and more specifically, to determining aging-related damage for semiconductor devices.

2. Related Art

Semiconductor devices such as integrated circuits and printed circuit boards often perform several different functions to process data and interface with external components. The circuit design process often includes generating and testing a software model of a semiconductor device using Electronic Design Automation (EDA) tools. The EDA tools allow designers to prepare various views of components and interconnections between components that are included in a circuit. Models of the components can be used to simulate the performance of the circuit. Once the simulated model of the circuit is tested, files for other components in the design are converted to a gate-level description of the circuit(s). Placement and routing tools can be used on the gate-level descriptions to create a physical layout. The layout can be converted and stored in a format that is used by semiconductor foundries to manufacture the devices according to specifications.

The simulation can also take into account aging effects on some or all of the transistors that are included in a circuit. Incorporating the aging effects in the simulation allows designers to determine whether the circuit will still perform acceptably at or near the end of the expected life of the circuit. One aging effect in metal oxide semiconductor field effect transistors (MOSFETs) is known as bias temperature instability (BTI) that typically becomes a factor at high gate to source voltages ($V_{GS}$). A high $V_{GS}$ creates a high vertical electric field across the gate channel, which leads to carriers (electrons or holes) in the transistor channel being pulled into the gate dielectric, thus damaging the gate dielectric. In high-k (where k is the dielectric constant of the material) metal gates, the damage may be proportional to the length and width of the channel. For digital circuits, BTI is more prevalent during static periods of operation than during switching.

Another aging effect is known as hot carrier injection (HCI) damage, which can occur when $V_{GS}$ is greater than threshold voltage ($V_T$), with moderate to high drain source voltage ($V_{DS}$). The high electric field at the drain causes impact ionization of current carriers. HCI damage is inversely proportional to channel length, and is more prevalent during switching than static operation in digital operation.

BRIEF DESCRIPTION OF THE DRAWINGS

The present disclosure is illustrated by way of example and is not limited by the accompanying figures, in which like references indicate similar elements. Elements in the figures are illustrated for simplicity and clarity and have not necessarily been drawn to scale.

DETAILED DESCRIPTION

Embodiments of systems and methods disclosed herein measure and apply aging effects in transistors. The aging effects are based on damage to the gate oxide of the transistors caused by two or more sources of damage such as hot carrier injection (HCI) and bias temperature instability (BTI), among others. At certain combinations of gate, drain, and body voltages, two or more forms of damage may play a role in the aging of the transistor over time. The type and amount of damage depends on bias voltages, temperatures, and channel length and width. Some forms of damage, such as BTI, may also exhibit partial recovery when a transistor is off. A damage metric is generated for each transistor in a circuit that can take into account the impact of two or more sources of damage, as well as recovery from certain types of damage. The damage metric is converted to a performance parameter such as a threshold voltage shift or drive current degradation. The performance parameter is taken into account in a simulation model of the circuit to determine whether or not the desired performance will be met over the life of the circuit.

Figure 1:
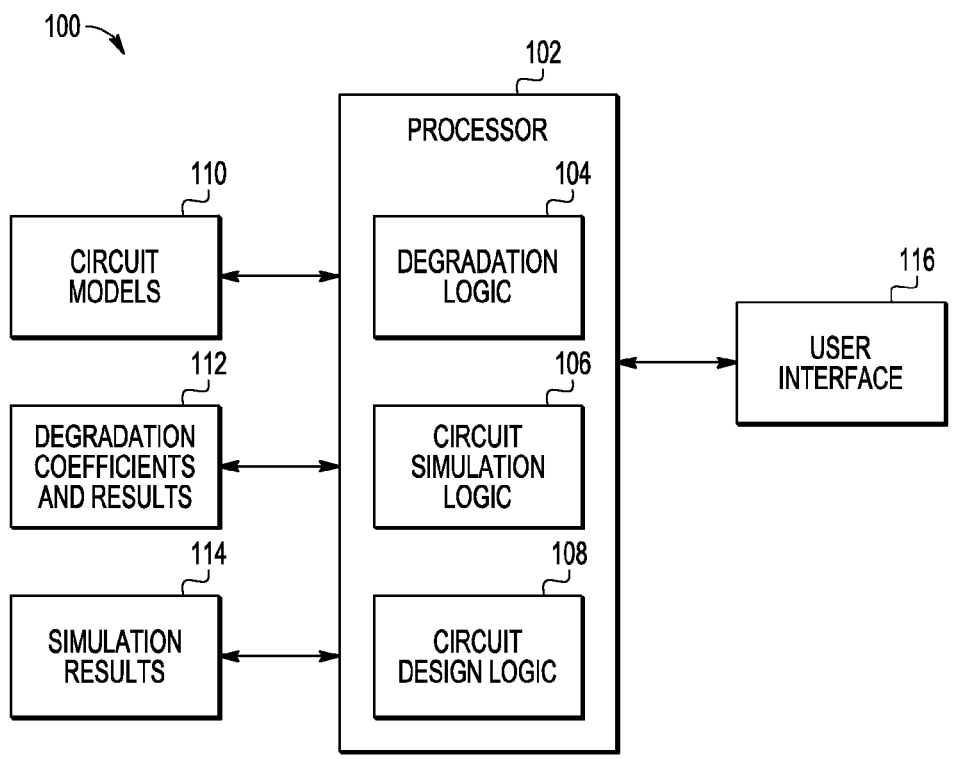
FIG. 1 is a block diagram of an embodiment of a computer system that can be used to determine aging effects in transistors in accordance with the present invention.

FIG. 1 is a block diagram of an embodiment of a computer system 100 that can be used to implement methods for determining aging effects for transistors in a circuit in accordance with the present invention. Computer system 100 can include processor 102 capable of executing degradation logic 104, circuit simulation logic 106, and circuit design logic 108. Processor 102 can access or communicate with circuit models 110, degradation coefficients and results 112, simulation results 114, and user interface 116.

Processor 102 can include a central processing unit (CPU), one or more memory unit(s), and input/output (I/O) controllers and interfaces. Processor 102 is an information handling system which can be designed to give independent computing power to one or more users. Processor 102 may be found in many forms including but not limited to mainframes, minicomputers, servers, workstations, personal computers, notepads, personal digital assistants, and various other devices. Processor 102 can be configured for bi-directional communication with circuit models 110, degradation coefficients and results 112, simulation results 114, and user interface 116.

A computer system processes information according to a program and produces resultant output information via I/O devices. A program is a list of instructions such as a particular application program and/or an operating system. In the example shown, degradation logic 104, circuit simulation logic 106, and circuit design logic 108 may be implemented in hardware circuits, software programs, or a combination of hardware and software. Software programs are typically stored internally to processor 102 on computer readable storage medium or transmitted to the computer system via a computer readable transmission medium. Processor 102 executes (runs) programs or portions of a program, using current program values and state information, and resources used by an operating system to manage the execution of the program(s). A parent program may spawn other, child programs to help perform the overall functionality of the parent program. The operating system may control operation of the processing hardware and memory units as well as software programs.

Circuit design logic 108 can access a circuit model 110 of a component for a semiconductor device. The representation can be one or more RTL cell files, tag cell files, view files, and/or other suitable types of files. The circuit model 110 can be implemented as a file on computer storage media. Circuit simulation logic 106 can use the circuit model 110 to simulate the performance of the circuit model 110.

Circuit design logic 108 and circuit simulation logic 106 can be Electronic Design Automation (EDA) programs and other application programs that aid users in designing and simulating/testing semiconductor circuits. Examples of circuit design logic 108 and circuit simulation logic 106 that are commercially available include the Allegro and OrCAD, and PSpice suites of tools from Cadence Design Systems in San Jose, Calif.

Circuit model 110 can include files containing representations of a collection of low-level logic functions such as AND, OR, NOT, flip-flops, latches, and buffers, as well as more complex components comprised of a several functions. A circuit to be tested can include one or more of the logic functions as well as individual transistors and other components. An RTL library can include a library data file of a number of views of a circuit, such as layout, schematic, symbol, abstract, and other logical or simulation views. Voltage waveforms input and/or output by the circuit under test can also be included in circuit model 110.

Degradation coefficients and results 112 store information that is used by degradation logic 104 to determine the aging effects of various types of damage to transistors in the circuit being tested. Information regarding the transistors such as channel length and width and type of each transistor, voltages input to or output from nodes of the transistors during operation, and other information useful for calculating damage to a transistor during operation over a predetermined amount of time or number of switching cycles, can be included in degradation coefficients and results.

Coefficients, constants, and other parameters used to calculate damage can be also be stored in degradation coefficients and results 112. For example, degradation logic 104 can be implemented with one or more empirical, multivariable formulae that take into account temperature of the transistor Simulation results 114 can be used to store the results of circuit simulation logic 106. The results of the simulations can be used to determine whether circuits that have aging effects applied to them meet desired performance criteria over a predetermined lifetime or lifecycle. The simulation results of the aged circuits and the damage/aging effect parameters applied to each of the transistors can be stored in degradation coefficients and results 112 and simulation results 114. Information in degradation coefficients and results 112 and simulation results 114 can be presented to or accessed by a user through user interface 116.

One or more of various types of memory and/or storage devices can be used to store information for degradation coefficients and results 112, simulation results 114, and circuit models 110, such as flash drives, hard drives, memory cards, solid state drives, cloud storage, optical storage, or other suitable type of memory or storage device(s).

System 100 can be connected to communicate over a local area network, wide area network, peer-to-peer network, and/or a worldwide information network such as the Internet.

User interface 116 can include a pointing device such as a keyboard, mouse, touch pad, and/or trackball, display, printer, and/or other suitable interface or input/output device to allow the user to interact with components in and accessed by processor 102.

FIG. 1 is intended as an example and not as a structural limitation of embodiments of the present invention.

Figure 2:
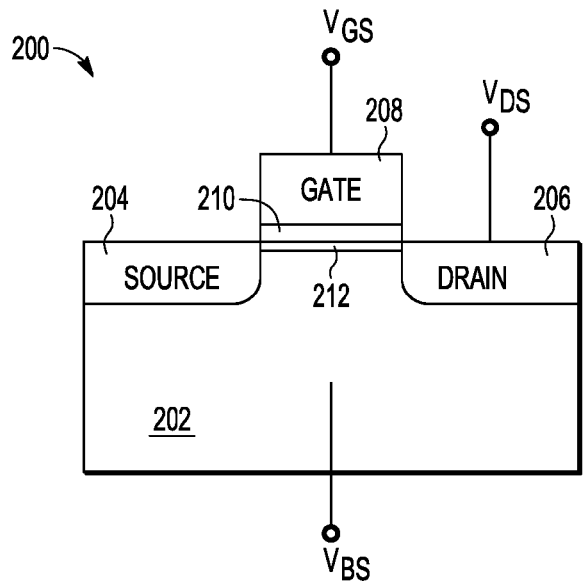
FIG. 2 is an example of a transistor showing voltages that may be used to determine aging effects for the transistor.

FIG. 2 is an example of a transistor 200 showing voltages that may be used to determine aging effects for the transistor 200. Transistor 200 includes a body/well portion 202, source electrode 204, drain electrode 206, gate electrode 208, gate dielectric 210, and channel 212. In some embodiments, transistor 200 is a high-k metal gate transistor in which gate dielectric 210 is made of hafnium dioxide or other suitable high-k material to isolate gate electrode 208 from channel 212. Transistor 200 can be either a PMOS transistor in which source electrode 204 and drain electrode 206 are doped with P-type material, or an NMOS transistor in which source electrode 204 and drain electrode 206 are doped with N-type material. Gate electrode 208 is made of a suitable conductive metal. Body/well portion 202 is formed by doping a portion of a silicon substrate with N or P-type material, i.e., if source electrode 204 and drain electrode 206 are doped with P-type material, body portion 202 is doped with N-type material, and if source electrode 204 and drain electrode 206 are doped with N-type material, body portion 202 is doped with P-type material.

During operation, a gate-source voltage ($V_{GS}$) may be applied to a node at gate 208, a drain-source voltage ($V_{DS}$) may be applied to a node at drain electrode 206, and body-source voltage ($V_{BS}$) may be applied to a node at body portion 202. A minimum level of voltage, referred to as threshold voltage ($V_T$), is required to turn "on" an NMOS transistor and to turn "off" a PMOS transistor.

Note that transistor 200 is shown only as an example of a type of transistor and corresponding voltages for which embodiments of systems and methods for determining aging effects can be used. The embodiments of systems and methods for determining aging effects disclosed herein can also be applied to other types of transistors and other voltages applied to the transistors. Additionally, other types of damage may be taken into account to determine aging effects in addition to, or instead of, the types of damage used as examples herein.

Figure 3:
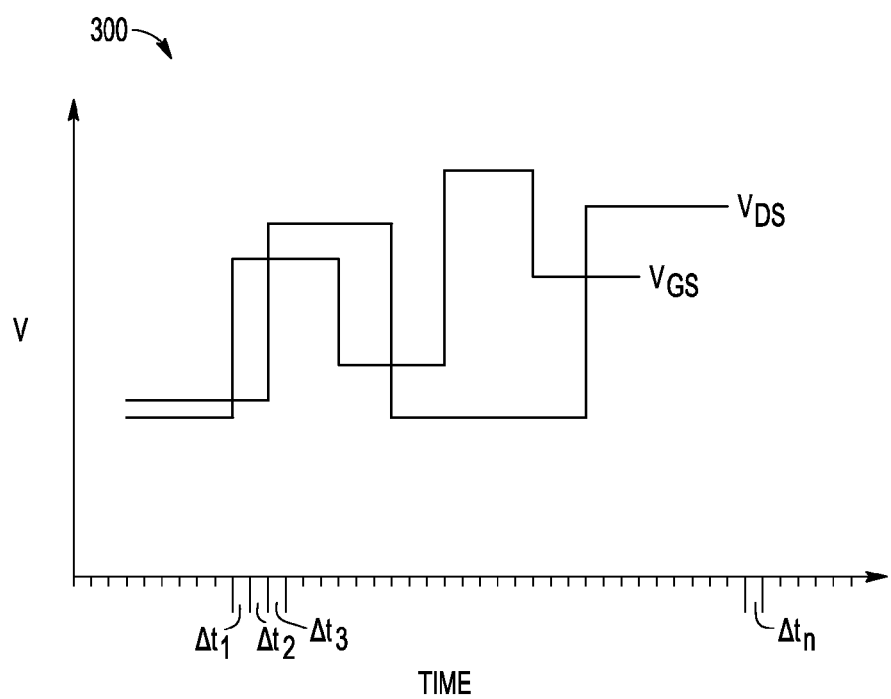
FIG. 3 is an example of voltage waveforms that may be used to determine two or more types of damage to a transistor.

FIG. 3 is an example of a time history 300 of voltage waveforms for $V_{DS}$ and $V_{GS}$ that may be used to determine two or more types of damage for a transistor. Data for time history 300 may be stored in circuit models 110 (FIG. 1) or other suitable location in system 100. The values of one or more of the voltages are input to the circuit being tested at time slices ($\Delta t_1, \Delta t_2, \Delta t_3 \ldots \Delta t_n$) taken at regular, consecutive intervals. The time slices are small enough to accurately represent the waveforms over a series of time slices. In one embodiment, the average values of the respective voltages within each time slice may be used.

Figure 4:
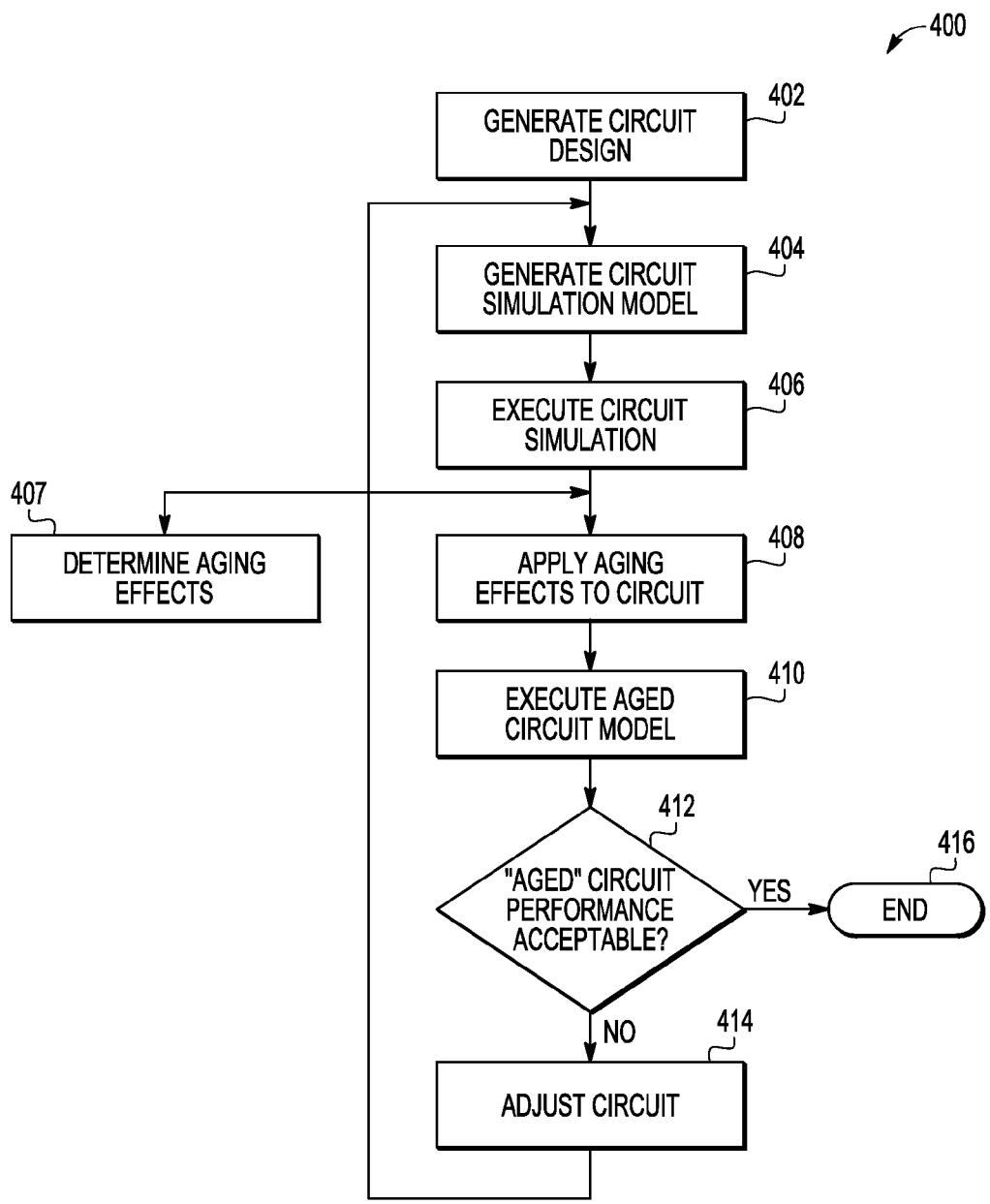
FIG. 4 is a flowchart of an embodiment of a method for taking aging effects into account during a circuit design process.

FIG. 4 is a flowchart of an embodiment of a method 400 for taking aging effects into account during a circuit design process. Process 402 can include generating a circuit design, such as by using one of several commercially available computerized design systems known as electronic design automation (EDA) tools. The circuit design can be stored in files along with characteristics of the components used in the circuit. For example, characteristics of each transistor included in a circuit design can be included in the circuit model. The characteristics such as type of transistor, type of materials used in the transistor, dimensions of the transistor, among others, can be used to determine damage and aging effects of the transistors over time.

Process 404 can include generating a simulation model of the circuit design, which is a mathematical model that replicates the behavior of the circuit. The simulation model can be implemented in a software language that is executed by circuit simulation logic 106 (FIG. 1). The simulation model can be generated from the circuit design entered into and EDA tool or system or other suitable technique.

Process 406 can include executing the circuit simulation model, such as by executing the simulation model using circuit simulation logic 106 (FIG. 1). The results of the simulation, such as voltages and currents generated at specified nodes of components in the circuit, can be stored in simulation results 114 (FIG. 1). The initial simulation supplies baseline performance results of the circuit without aging effects.

Process 407 can include determining aging effects for components such as transistors in the circuit design. The aging effects can be based on components that have been implemented in hardware and subjected to a range of temperatures and voltages over a number of operational cycles or time period. The performance of the components can be measured at various stages of the test. The measurements can be used to generate curve-fit functions or equations, or data tables, to model the damage of each component or type of component. Coefficients and constants for the equations can be stored along with the functions or equations. Once the level of damage or degradation for each component is known for a specified set of test criteria, aging effects can be determined. The aging effects can be specified as a shift in threshold voltage or drive current for one or more of the transistors in the simulation model. Other suitable parameters that allow damage to the transistor performance to be simulated can be used.

Process 408 can include applying aging effects to the circuit model, such as by including the shifted threshold voltages or drive currents for the transistors with the circuit model. Components that have the same physical characteristics and expected performance can use the same aging effect(s), and different aging effects can be used for components that have different physical characteristics and performance.

Process 410 can include using the aging effects such as shifted threshold voltages or drive currents for the transistors during another simulation. The results of the simulation with the aging effects can be stored in simulation results 114 (FIG. 1). The results of the simulation with the aging effects can be used to determine whether the "aged" circuit performance meets specified criteria for acceptable performance in process 412. For example, acceptable performance criteria can be specified as each transistor or other component operating correctly within the voltage ranges available in the aged circuit. Other suitable criteria for acceptable performance can be used.

If the aged circuit performance is not acceptable, the circuit design can be adjusted in process 414 to use different components or different input parameters, such as input voltage levels or the amount of time the voltages are applied to one or more of the nodes of the transistors. In some cases, only the components that do not meet the specified "aged" performance criteria may need to be adjusted or changed. Process 414 can then transition back through to processes 404-412 to generate and test a new simulation model of the revised circuit. Once the aged circuit performance is found to be acceptable in process 412, method 100 ends at process 416.

Figure 5:
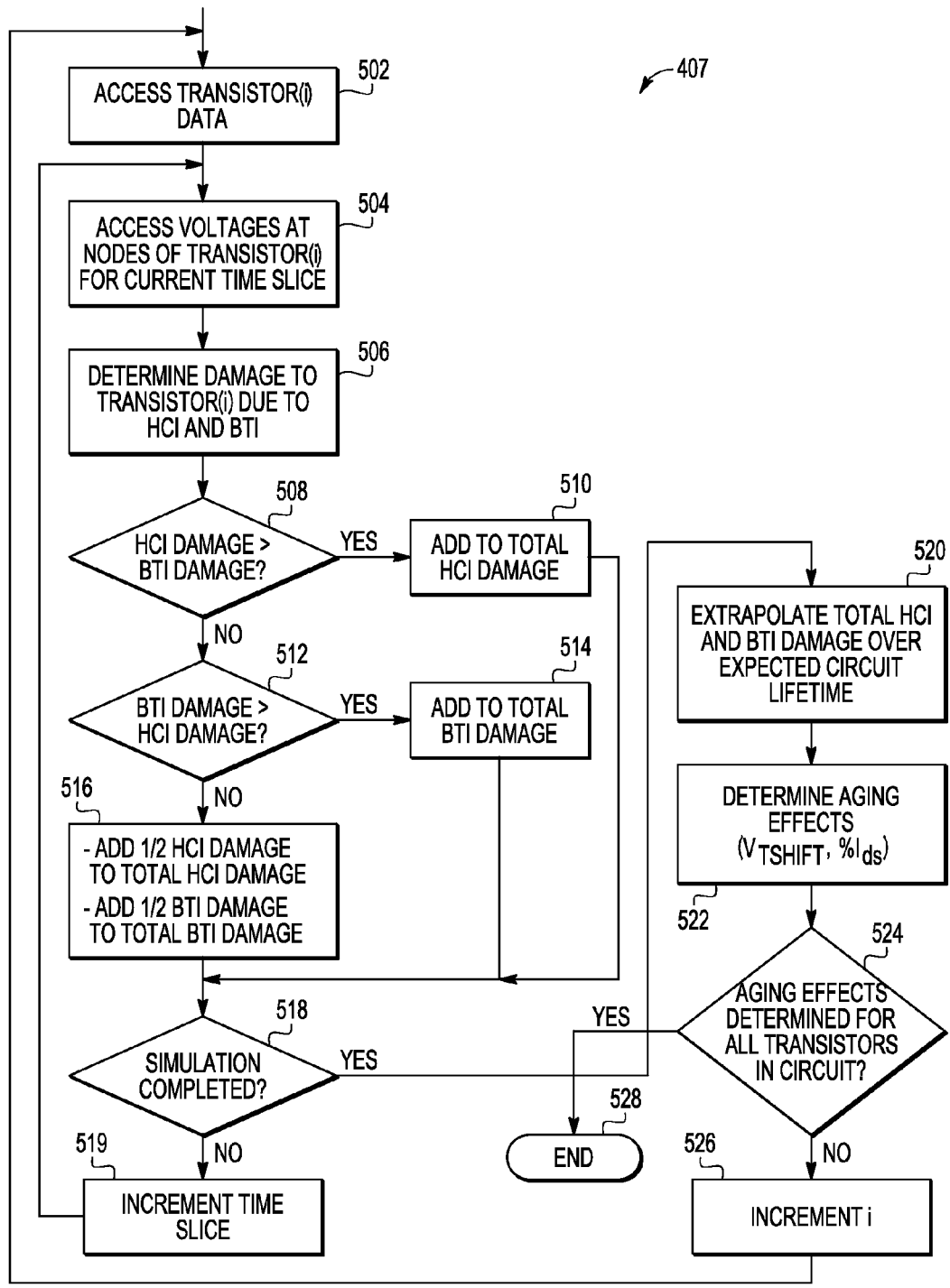
FIG. 5 is a flow diagram of an embodiment of a method for determining aging effects for one or more transistors in a circuit design.

FIG. 5 is a flow diagram of an embodiment of a method 407 for determining aging effects for one or more transistors in a circuit design that can be used in method 400 of FIG. 4. During circuit operation, a transistor may see an arbitrary waveform at any slice in time so the contribution of different types of damage may vary. Previously known approaches to determining aging effects in transistors categorize the damage as being from just one mode or another depending on the value of the voltages, which may not always be accurate. Alternatively, other approaches assume both forms of damage occur at the same time, which may be overly pessimistic. Method 407 determines aging effects by taking into account two or more different types of damage that can occur in the same transistor based on the levels of voltage being applied at each time slice during simulated operation and which type of damage is more likely to occur at the voltage levels used during the time slice.

In method 407, process 502 can include accessing transistor data for a first transistor in the circuit. The data can include the type of transistor, length and width of the transistors channel, and any other information that is used in calculating damage and aging effects of the transistor. The data can be stored in circuit models 110 (FIG. 1) or other suitable location.

Process 504 can include accessing voltages or voltage waveform data to be applied at nodes of the transistor, such as gate-source voltage ($V_{GS}$), drain-source voltage ($V_{DS}$), and body-source voltage ($V_{BS}$), during the simulation. The voltage data can be stored in a table, as a function or equation, or other suitable format. The waveforms 300 of FIG. 3 show a graph of an example of waveforms that can be used over a series of time slices ($\Delta t_i$), however, other values can be used.

Process 506 can include determining damage to the transistor due to HCI and BTI. Damage models can be derived from literature, foundry data, and/or in-house data taken from empirical studies. The damage model can be stored in a table or as a function/equation. In some cases, an equation may require coefficients and/or constants. Information required to calculate damage for a particular transistor can be stored in degradation coefficients and results 112, degradation logic 104 (FIG. 1) or other suitable location. Degradation logic 104 can access circuit models 110 and degradation coefficients and results to determine which damage model to use for a transistor.

As an example, damage or degradation D due to HCI and BTI can be determined using the following relational expression:

$$D = K * \text{Time} * f(V_{DS}) * f(V_{GS}) * f(V_{BS}) * \exp(E_a/kT) * f(W,L,\text{type}) * f(\text{Freq})$$

where:
  K is a constant that may differ for different Vt devices
  Time is the amount of time in the time slice (a)
  $f(V_{DS})$ is a power law or exponential function of $V_{DS}$ for the transistor type
  $f(V_{GS})$ is a power law or exponential function of $V_{GS}$ for the transistor type
  $f(V_{BS})$ is a power law or exponential function of $V_{BS}$ for given transistor type
  $E_a$ is Arrhenius activation energy
  k is Boltzmann's constant
  T is temperature
  f(W, L, type) is a power law or inverse linear/log function of transistor channel width and length for the transistor type
  f(Freq) is a power law or exponential function of operating frequency The power laws or exponential functions in the relational expression for D can be determined by subjecting components that have been implemented in hardware to a range of temperatures and voltages over a number of operational cycles or time period. The performance of the components can be measured at various stages of the test. The measurements can be used to generate curve-fit power law or exponential functions that model the degradation in performance for each component or type of component. Other suitable techniques for determining two or more different types of damage to the components such as transistors can be used.

Once the level of damage or degradation for each component is known for a specified set of test criteria, aging effects can be determined as further described herein. The aging effects can be specified as a shift in threshold voltage or drive current for one or more of the transistors in the simulation model. Other suitable parameters that allow damage to the transistor performance to be simulated can be used.

As an example, the following equations show a damage model that was developed using Taiwan Semiconductor Manufacturing Company's reliability calculators, rev1.0 dated Apr. 11, 2012, for the cases shown below except for core NMOS HCI, where the stress voltage dependence has been replaced with in-house data taking both $V_{DS}$ and $V_{GS}$ into account. For core PMOS HCI, a model similar in nature to the core NMOS HCI was developed as shown below. The models provide more realistic estimates for longer channel-length devices, which in turn affects the power-law exponent for the $V_T$ shift dependence for core NMOS HCI. Additionally, devices for Input-Output functions in a circuit have different characteristics from core devices. For IO NMOS and PMOS HCI, the model shown below is applicable only at $|V_{GS}|>0.5$ V, in order to avoid over-estimating the damage at low $V_{GS}$.

In all cases, the absolute values of $V_{DS}$ and $V_{GS}$ (both in Volts) are used. Time is in seconds, T is the temperature in Kelvin, and L is channel length in nanometers on silicon (i.e., taking shrink effects into account). Different values for the constant K, and different expressions for f(L), were used based on the length L (in nanomemters) of the channel.

Core NMOS

HCI $D_{HCI} = K * \text{Time} * (V_{DS}^{14.1579}) * (V_{GS}^{13.8803}) * \exp(-0.1373/kT) * f(L)$ $f(L): \quad [27 <= L <= 85.5]: \quad 1/(0.0892*L - 2.2283)$
$\qquad [85.5 < L <= 270]: \quad 1/(6.575*\ln(L) - 23.676)$
$\qquad [270 < L <= 900]: \quad 1/(3.1413*\ln(L) - 4.1415)$ $K: \quad [27 <= L <= 85.5]: \quad 3.967E-04$
$\qquad [85.5 < L <= 270]: \quad 4.256E-04$
$\qquad [270 < L <= 900]: \quad 4.159E-04$

BTI $D_{BTI} = K * \text{Time} * \exp(-0.5689/kT) * \exp(27.85*V_{GS}) * f(L)$ $f(L): \quad [27 <= L <= 85.5]: \quad L^{2.215}$
$\qquad [85.5 < L <= 270]: \quad L^{0.704}$
$\qquad [270 < L <= 900]: \quad L^{0.185}$ $K: \quad [27 <= L <= 85.5]: \quad 6.19E-13$
$\qquad [85.5 < L <= 270]: \quad 5.88E-10$
$\qquad [270 < L <= 900]: \quad 1.12E-08$ Core PMOS

HCI $D_{HCI} = K * \text{Time} * (V_{DS}^{13.65}) * (V_{GS}^{13.35}) * \exp(-0.6098/kT) * f(L)$ $f(L): \quad [27 <= L <= 85.5]: \quad 1/(0.1121*\ln(L) - 0.2854)$
$\qquad [85.5 < L <= 270]: \quad 1/(0.0617*\ln(L) - 0.0594)$
$\qquad [270 < L <= 900]: \quad 1/(0.0202*\ln(L) + 0.1749)$ $K: \quad [27 <= L <= 85.5]: \quad 6.253E+06$
$\qquad [85.5 < L <= 270]: \quad 6.235E+06$
$\qquad [270 < L <= 900]: \quad 6.170E+06$

BTI $D_{BTI} = K * \text{Time} * \exp(-1.0227/kT) * V_{GS}^{32} * f(L)$ $f(L): \quad [27 <= L <= 85.5]: \quad L^{1.865}$
$\qquad [85.5 < L <= 270]: \quad L^{0.592}$
$\qquad [270 < L <= 900]: \quad L^{0.16}$ $K: \quad [27 <= L <= 85.5]: \quad 2.77E+10$
$\qquad [85.5 < L <= 270]: \quad 8.91E+12$
$\qquad [270 < L <= 900]: \quad 1.04E+14$ IO NMOS
  BTI
  Not an issue, hence no model provided.

HCI [Applicable at $V_{GS} > 0.5$ V]

$D_{HCI} = K * \text{Time} * \exp(-63.527/V_{DS}) * \exp(0.071/kT) * f(L)$ $f(L): \quad [81 <= L <= 94.5]: \quad L^{-9.5384}$
$\qquad [94.5 < L <= 180]: \quad L^{-6.2692}$
$\qquad [180 < L <= 630]: \quad L^{-2.2943}$
$\qquad [630 < L <= 1800]: \quad L^{-0.7505}$ $K: \quad [81 <= L <= 94.5]: \quad 2.6028E+30$
$\qquad [94.5 < L <= 180]: \quad 8.1365E+23$
$\qquad [180 < L <= 630]: \quad 4.16E+14$
$\qquad [630 < L <= 1800]: \quad 2.33E+10$ IO PMOS
  BTI
  $D_{BTI} = 7.30E+00 * \text{Time} * \exp(-0.4944/kT) * V_{GS} 25.72$ HCI [Applicable at $V_{GS} > -0.5$ V]

$D_{HCI} = K * \text{Time} * \exp(-62.456/V_{DS}) * \exp(0.216/kT) * f(L)$ $f(L): \quad [81 <= L <= 94.5]: \quad L^{-10.239}$
$\qquad [94.5 < L <= 180]: \quad L^{-6.7549}$
$\qquad [180 < L <= 630]: \quad L^{-2.4744}$
$\qquad [630 < L <= 1800]: \quad L^{-0.8099}$ -continued K: [81 <= L <= 94.5]: 8.6374E+26
   [94.5 < L <= 180]: 1.00892E+20
   [180 < L <= 630]: 9.94E+09
   [630 < L <= 1800]: 2.60434E+05

Process 506 can further take degradation recovery effects into account when determining overall damage or degradation. For example, a model for BTI recovery in PMOS transistors can be used along with the damage model to determine net degradation or damage to the transistors. Any suitable recovery model can be used, such as the recovery model provided in "Frequency and Recovery Effects in High-κ BTI Degradation", by Ramey, S. et al., Proceedings of Reliability Physics Symposium, 2009 IEEE International, pages 1023-1027.

Process 508 includes determining whether damage due to HCI is greater than damage due to BTI. If so, process 510 adds the increment of HCI damage for the current time slice to total HCI damage. That is, the HCI damage is integrated over the duration of the simulation.

Process 512 includes determining whether damage due to BTI is greater than damage due to HCI. If so, process 514 adds the increment of BTI damage for the current time slice to total BTI damage. That is, the BTI damage is integrated over the duration of the simulation.

Processes 510 and 514 transition to process 518.

If the conditions of processes 508 and 512 were not met, HCI damage is assumed to be approximately the same as BTI damage. Process 516 is then performed to add one-half of the BTI damage to the total BTI damage and one-half of the HCI damage to the total HCI damage. Process 516 transitions to process 518.

Process 518 determines whether the simulation has completed. The simulation is considered complete when each transistor has been simulated for each time slice. If the simulation has not completed, the time slice is incremented and control transitions back to process 504. Processes 504 through 516 are performed for the incremented time slice for the current transistor, and so on, until processes 504-516 have been performed for the final time slice for the current transistor.

If process 518 determines that the simulation for the current transistor is complete, process 520 extrapolates the total HCI damage and the total BTI damage for the current transistor over the expected lifetime of the circuit. In an alternate embodiment, multiple transistors can be evaluated in parallel.

Once the damage due to HCI and BTI were found, process 522 determines the aging effect, such as shift in the threshold current or a change in the drive current required to saturation for the transistor. In the example damage calculations shown above for core and IO NMOS and PMOS transistors in process 506, the voltage shift ($V_T$ shift) can be found by taking the total damage to an exponential value. The exponential value for $V_T$ shift is based on fitting the calculator or empirical data to a model. Based on the examples of total HCI and BTI damage mentioned herein for process 506, examples of expressions for threshold voltage shifts in milliVolts for the core and IO NMOS and PMOS transistors are as follows:

Core NMOS
HCI
$V_T\text{shift}=D_{HCI}^{0.464309}$
BTI
$V_T\text{shift}=D_{BTI}^{0.211977}$
Core PMOS
HCI
$V_T\text{shift}=D_{HCI}^{0.18048}$
BTI
$V_T\text{shift}=D_{BTI}^{0.148045}$
IO NMOS
BTI
Not an issue, hence no model provided.
HCI [Applicable at $V_{GS}>0.5$ V]
$V_T\text{shift}=D_{HCI}^{0.4182}$
PMOS
BTI
$V_T\text{shift}=D_{BTI}^{0.177968}$
HCI [Applicable at $V_{GS}<-0.5$ V]
$V_T\text{shift}=D_{HCI}^{0.489764}$ Other techniques for determining the shift in threshold voltage can be used. Additionally, other transistor aging effects such as a shift in saturation drive current, among others, can be used. Once the aging effects are determined for the current transistor, process 524 determines whether the aging effects for all of the transistors in the circuit have been determined. If not, process 526 increments an index into a list of the transistors for the circuit and transitions to process 502 to access the data for the next transistor. Processes 504-524 are repeated until aging effects for all of the transistors in the circuit have been determined. Process 528 then ends method 407.

Figure 6:
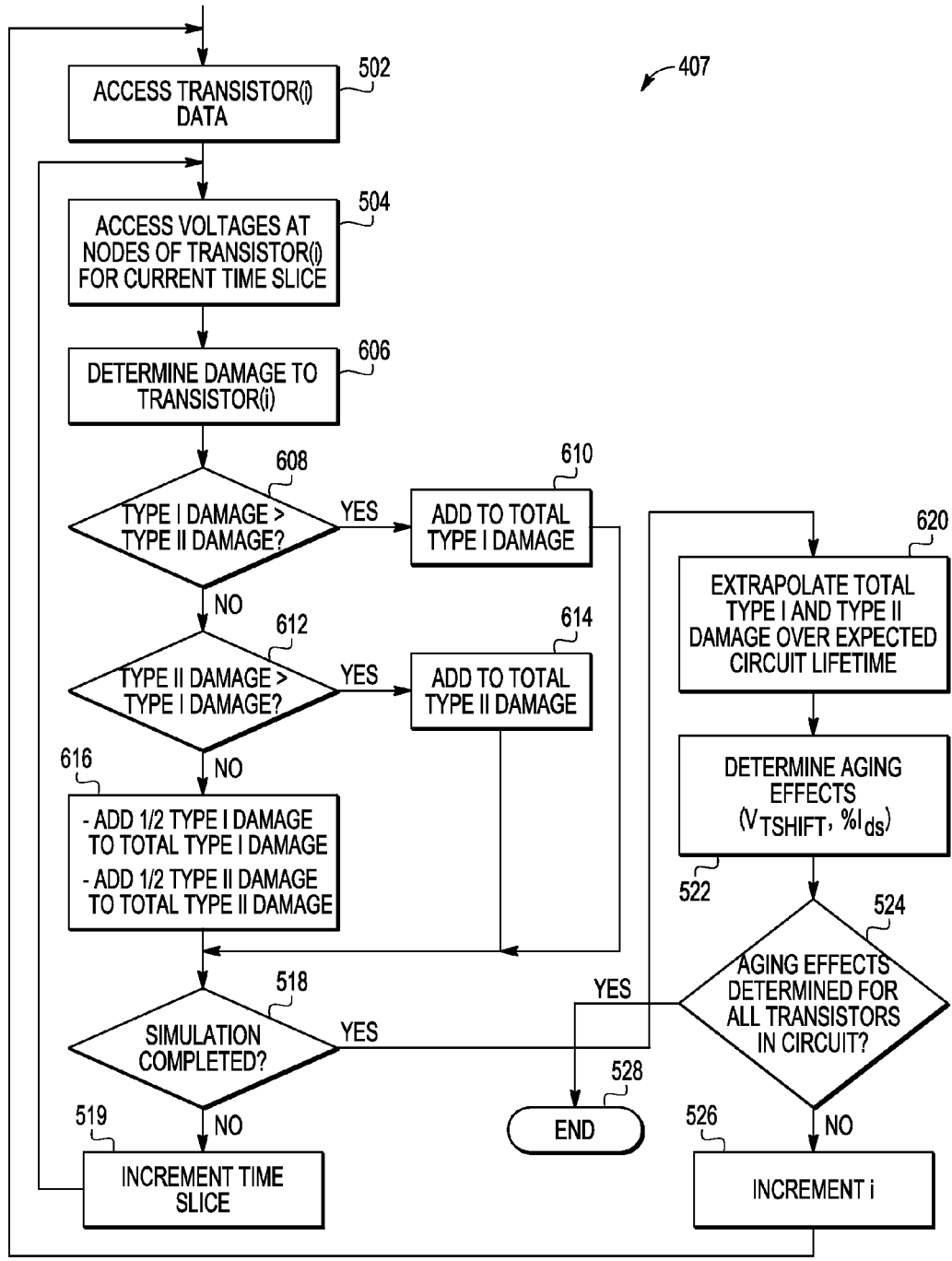
FIG. 6 is a flow diagram of another embodiment of a method for determining aging effects for one or more transistors in a circuit design.

FIG. 6 is a flow diagram of another embodiment of a method 407 for determining aging effects for one or more transistors in a circuit design that can be used in method 400 of FIG. 4. Instead of using HCI and BTI specifically, method 407 of FIG. 6 has been generalized to consider aging effects based a first type of damage and a second type of damage.

In method 407, process 502 can include accessing transistor data for a first transistor in the circuit and process 504 can include accessing voltages or voltage waveform data to be applied at nodes of the transistor, similar to processes 502 and 504 for process 407 of FIG. 5. Process 606 can include determining damage to the transistor due to a first type of damage and a second type of damage, as well as any recovery from damage or degradation. Damage and recovery models can be derived from literature, foundry data, and/or in-house data taken from empirical studies. The damage model can be stored as a table or a function/equation. In some cases, an equation may require coefficients and/or constants. Information required to calculate damage/recovery for a particular transistor can be stored in degradation coefficients and results 112, degradation logic 104 (FIG. 1) or other suitable location. Degradation logic 104 can access circuit models 110 and degradation coefficients and results to determine which damage and recovery models to use for a transistor.

Process 608 includes determining whether the first type of damage is greater than the second type of damage. If so, process 610 adds the increment of the first type of damage for the current time slice to total first type of damage. That is, the first type of damage is integrated over the duration of the simulation.

Process 612 includes determining whether the second type of damage is greater than first type of damage. If so, process 614 adds the increment of the second type of damage for the current time slice to total second type of damage. The second type of damage is integrated over the duration of the simulation.

Processes 610 and 614 transition to process 518.

If the conditions of processes 608 and 612 were not met, the first type of damage is assumed to be approximately the same as the second type of damage. Process 616 is then performed to add one-half of the first type of damage to the total first type of damage and one-half of the second type of damage to the total second type of damage. Process 616 transitions to process 518.

Process 518 determines whether the simulation has completed. The simulation is considered complete when each transistor has been simulated for each time slice. If the simulation has not completed, the time slice is incremented and control transitions back to process 504. Processes 504 through 616 are performed for the incremented time slice for the current transistor, and so on, until processes 504-616 have been performed for the final time slice for the current transistor.

If process 518 determines that the simulation for the current transistor is complete, process 620 extrapolates the total first type of damage and the total second damage for the current transistor over the expected lifetime of the circuit.

Once the total first and second types of damage are found, process 522 determines the aging effect, such as shift in the threshold current or a change in the drive current required to saturation for the transistor using any suitable technique. Additionally, other transistor aging effects such as a shift in saturation drive current, among others, can be used. Once the aging effects are determined for the current transistor, process 524 determines whether the aging effects for all of the transistors in the circuit have been determined. If not, process 526 increments an index into a list of the transistors for the circuit and transitions to process 502 to access the data for the next transistor. Processes 504, 606-616, and 518-524 are repeated until aging effects for all of the transistors in the circuit have been determined. Process 528 then ends method 407.

By now it should be apparent that in some embodiments, methods disclosed herein can include generating a circuit design 402; executing a simulation of the circuit design 404, 406 at a plurality of time slices; determining 506 type 1 damage and type 2 damage for each time slice; providing a total type 1 damage 608, 610 as a sum of the type 1 damage for all of the slices in which type 1 damage is greater than type 2 damage; and providing a total type 2 damage 612, 614 as a sum of the type 2 damage for all of the slices in which type 2 damage is greater than type 1 damage. Type 1 and type 2 aging effects 520, 522 are determined based on the total type 1 damage and the total type 2 damage. The type 1 aging effect is added to the type 2 aging effect to obtain a total aging effect. The circuit design 410, 412 is tested using the total aging effect to determine if the circuit design provides adequate lifetime performance.

In another aspect, the executing the simulation can comprise determining 504 voltages at nodes of the circuit design at the plurality of time slices. The circuit design includes a plurality of transistors wherein each transistor of the plurality of transistors is simulated at the plurality of time slices.

In another aspect, the determining the type 1 aging effect based on the total type 1 damage can comprise an extrapolation 520 of the type 1 damage for a predetermined time period.

In another aspect, the determining the type 1 aging effect can be further characterized by the predetermined time period being an expected operational lifetime 520 of the circuit design.

In another aspect, the determining the type 2 aging effect based on the total type 2 damage can comprise an extrapolation 520 of the type 2 damage for the predetermined time period.

In another aspect, the method can further comprise determining damage recovery for each time slice, and including the damage recovery in at least one of the total type 1 damage and the total type 2 damage.

In another aspect, the method can further comprise making an operational circuit having the altered circuit design.

In another aspect, the determining type 1 damage can comprise determining 512 bias temperature instability damage.

In another aspect, the determining type 2 damage can comprise determining 508 hot carrier injection damage.

In another aspect, 516 the providing the total type 1 damage includes including one half of the type 1 damage in the total type 1 damage for each slice in which the type 1 damage equals the type 2 damage; and the providing the total type 2 damage includes including one half of the type 2 damage in the total type 2 damage for each slice in which the type 2 damage equals the type 1 damage.

In other embodiments, a method 400 can comprise generating a circuit design 402; executing a simulation 404, 406 of the circuit design to provide voltages at nodes of a plurality of transistors that comprise the circuit design at a plurality of time slices; determining damage 506, 508, 512 due to a type 1 cause and a type 2 cause for each time slice of the plurality of time slices for each transistor of the plurality of transistors by determining which of the type 1 cause and the type 2 cause is a dominant cause of damage for each time slice; adding the damage 510, 514 for all of the slices in which the type 1 cause is the dominant cause of damage to obtain a total type 1 damage for each transistor of the plurality of transistors; determining an aging effect 520, 522, 524 due to the type 1 cause based on the total type 1 damage for each transistor of the plurality of transistors; adding the damage 510, 514 for all of the slices in which the type 2 cause is the dominant cause of damage to obtain a total type 2 damage for each transistor of the plurality of transistors; determining an aging effect 520, 522, 524 due to the type 2 cause based on the total type 2 damage for each transistor of the plurality of transistors; adding the aging effect 520, 522, 524 due to the type 1 cause to the aging effect due to the type 2 cause to obtain a total aging effect for each transistor of the plurality of transistors; applying 408 the total aging effect for each transistor of the plurality of transistors to the circuit design; testing the circuit design 410 with the total aging effect added; and altering 414 the circuit to obtain an altered circuit design if the testing the circuit design reveals inadequate performance.

In another aspect, the determining the aging effect due to the type 1 cause can comprise extrapolating 520 the total type 1 damage based on a predetermined time period to obtain a time-based type 1 damage estimate and using the time-based type 1 damage estimate to obtain the aging effect due to the type 1 cause.

In another aspect, the determining the aging effect due to the type 1 cause is further characterized by the predetermined time being an expected lifetime 520 of an operation of the circuit design.

In another aspect, the method can further comprise making an integrated circuit having a circuit with the altered circuit design.

In another aspect, the executing the simulation can be further characterized by the voltages at nodes 504 comprising a gate/source voltage and a drain/source voltage for each transistor.

In another aspect, if the determining which of the type 1 cause and type 2 cause is a dominant cause of damage for each time slice results in a determination that the damage due to the type cause is equal to the damage due to the type 2 cause; then attributing 516 one half of the damage to each of the total type 1 damage and the total type 2 damage.

In another aspect, the determining damage can be further characterized by the type 1 cause can comprise bias temperature instability and the type 2 cause can comprise hot carrier injection.

In still other embodiments, a method 400 can comprise generating a circuit design 402; executing a simulation 504, 506 of the circuit design at a plurality of time slices to identify voltages at nodes of transistors that comprise the circuit design; determining 508, 512 type 1 damage and type 2 damage for each time slice using the voltages at the nodes for each time slice of the plurality of time slices; providing 514 a total type 1 damage as a sum of the type 1 damage for all of the slices in which type 1 damage is greater than type 2 damage; providing 514 a total type 2 damage as a sum of the type 2 damage for all of the slices in which type 2 damage is greater than type 1 damage; extrapolating 520 the total type 1 damage for an expected lifetime of an operation of a circuit having the circuit design to obtain an extrapolated type 1 damage; extrapolating 520 the total type 2 damage for the expected lifetime of the operation of the circuit having the circuit design to obtain an extrapolated type 2 damage; determining 522 a type 1 aging effect based on the extrapolated type 1 damage; determining 522 a type 2 aging effect based on the extrapolated type 2 damage; adding 520, 522 the type 1 aging effect to the type 2 aging effect to obtain a total aging effect; and testing 410, 412 the circuit design using the total aging effect to determine if the circuit design provides adequate lifetime performance.

In another aspect, the method can further comprise altering 414 the circuit design to obtain an altered circuit design if the testing the circuit design does not determine that the circuit design provides adequate performance; and making an integrated circuit that includes a circuit according to the altered circuit design.

In another aspect, the determining the type 1 damage can comprise determining bias temperature instability damage and determining the type 2 damage can comprise determining hot carrier injection damage.

The terms "software" and "program," as used herein, are defined as a sequence of instructions designed for execution on a computer system. Software, a program, or computer program, may include a subroutine, a function, a procedure, an object method, an object implementation, an executable application, an applet, a servlet, a source code, an object code, a shared library/dynamic load library and/or other sequence of instructions designed for execution on a computer system.

Some of the above embodiments, as applicable, may be implemented using a variety of different information processing systems. For example, although FIG. 3 and the discussion thereof describe an exemplary information processing architecture, this exemplary architecture is presented merely to provide a useful reference in discussing various aspects of the disclosure. Of course, the description of the architecture has been simplified for purposes of discussion, and it is just one of many different types of appropriate architectures that may be used in accordance with the disclosure. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

All or some of the software described herein may be received elements of system 600, for example, from computer readable media such as memory or other media on other computer systems. Such computer readable media may be permanently, removably or remotely coupled to an information processing system such as system 600. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

Although the disclosure is described herein with reference to specific embodiments, various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to disclosures containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method, comprising:
in a computer system, executing logic instructions for:
generating a circuit design;

simulating operation of the circuit design at a plurality of time slices;

determining type 1 damage and type 2 damage for each time slice;

providing a total type 1 damage as a sum of the type 1 damage for all of the slices in which type 1 damage is greater than type 2 damage;

providing a total type 2 damage as a sum of the type 2 damage for all of the slices in which type 2 damage is greater than type 1 damage;

determining a type 1 aging effect based on the total type 1 damage;

determining a type 2 aging effect based on the total type 2 damage;

adding the type 1 aging effect to the type 2 aging effect to obtain a total aging effect;

executing the simulation of the circuit design using the total aging effect to determine if the circuit design provides adequate lifetime performance, wherein the providing the total type 1 damage includes including one half of the type 1 damage in the total type 1 damage for each slice in which the type 1 damage equals the type 2 damage; and the providing the total type 2 damage includes including one half of the type 2 damage in the total type 2 damage for each slice in which the type 2 damage equals the type 1 damage.

2. The method of claim 1, wherein the executing the simulation comprises determining voltages at nodes of the circuit design at the plurality of time slices, wherein the circuit design includes a plurality of transistors wherein each transistor of the plurality of transistors is simulated at the plurality of time slices.

3. The method of claim 1, wherein the determining the type 1 aging effect based on the total type 1 damage comprises an extrapolation of the type 1 damage for a predetermined time period.

4. The method of claim 3, wherein the determining the type 1 aging effect is further characterized by the predetermined time period being an expected operational lifetime of the circuit design.

5. The method of claim 1, the determining the type 2 aging effect based on the total type 2 damage comprises an extrapolation of the type 2 damage for a predetermined time period.

6. The method of claim 1, further comprising providing an altered circuit design if the circuit design does not provide adequate lifetime performance.

7. The method of claim 1, further comprising determining damage recovery for each time slice, and including the damage recovery in at least one of the total type 1 damage and the total type 2 damage.

8. The method of claim 1, wherein the determining type 1 damage comprises determining bias temperature instability damage.

9. The method of claim 1, wherein the determining type 2 damage comprises determining hot carrier injection damage.

10. A method, comprising:

in a computerized electronic design automation system:

generating a circuit design;

executing a simulation of the circuit design to provide voltages at nodes of a plurality of transistors that comprise the circuit design at a plurality of time slices;

determining damage due to a type 1 cause and a type 2 cause for each time slice of the plurality of time slices for each transistor of the plurality of transistors by determining which of the type 1 cause and the type 2 cause is a dominant cause of damage for each time slice;

adding the damage for all of the slices in which the type 1 cause is the dominant cause of damage to obtain a total type 1 damage for each transistor of the plurality of transistors;

determining an aging effect due to the type 1 cause based on the total type 1 damage for each transistor of the plurality of transistors;

adding the damage for all of the slices in which the type 2 cause is the dominant cause of damage to obtain a total type 2 damage;

determining an aging effect due to the type 2 cause based on the total type 2 damage for each transistor of the plurality of transistors;

adding the aging effect due to the type 1 cause to the aging effect due to the type 2 cause to obtain a total aging effect for each transistor of the plurality of transistors, wherein if the determining which of the type 1 cause and type 2 cause is a dominant cause of damage for each time slice results in a determination that the damage due to the type 1 cause is equal to the damage due to the type 2 cause, then attributing one half of the damage to each of the total type 1 damage and the total type 2 damage;

applying the total aging effect to the circuit design for each transistor of the plurality of transistors;

executing the simulation of the circuit design with the total aging effect added;

altering the circuit to obtain an altered circuit design if the testing the circuit design reveals inadequate performance.

11. The method of claim 10, wherein the determining the aging effect due to the type 1 cause comprises extrapolating the total type 1 damage based on a predetermined time period to obtain a time-based type 1 damage estimate and using the time-based type 1 damage estimate to obtain the aging effect due to the type 1 cause.

12. The method of claim 11, wherein the determining the aging effect due to the type 1 cause is further characterized by the predetermined time being an expected lifetime of an operation of the circuit design.

13. The method of claim 12, further comprising making an integrated circuit having a circuit with the altered circuit design.

14. The method of claim 13, wherein the executing the simulation is further characterized by the voltages at nodes comprising a gate/source voltage and a drain/source voltage for each transistor.

15. The method of claim 10, wherein the determining damage is further characterized by the type 1 cause comprises bias temperature instability and the type 2 cause comprises hot carrier injection.

16. A method, comprising:

executing logic instructions in a computerized design system configured for:

generating a circuit design;

executing a simulation of the circuit design at a plurality of time slices to identify voltages at nodes of transistors that comprise the circuit design;

determining type 1 damage and type 2 damage for each time slice using the voltages at the nodes for each time slice of the plurality of time slices;

providing a total type 1 damage as a sum of the type 1 damage for all of the slices in which type 1 damage is greater than type 2 damage and including one half of the type 1 damage in the total type 1 damage for each slice in which the type 1 damage equals the type 2 damage;

providing a total type 2 damage as a sum of the type 2 damage for all of the slices in which type 2 damage is greater than type 1 damage and including one half of the type 2 damage in the total type 2 damage for each slice in which the type 2 damage equals the type 1 damage;

extrapolating the total type 1 damage for an expected lifetime of an operation of a circuit having the circuit design to obtain an extrapolated type 1 damage;

extrapolating the total type 2 damage for the expected lifetime of the operation of the circuit having the circuit design to obtain an extrapolated type 2 damage;

determining a type 1 aging effect based on the extrapolated type 1 damage;

determining a type 2 aging effect based on the extrapolated type 2 damage;

adding the type 1 aging effect to the type 2 aging effect to obtain a total aging effect;

executing the simulation of the circuit design using the total aging effect to determine if the circuit design provides adequate lifetime performance.

17. The method of claim 16, further comprising:

altering the circuit design to obtain an altered circuit design if the testing the circuit design does not determine that the circuit design provides adequate performance; and making an integrated circuit that includes a circuit according to the altered circuit design.

18. The method of claim 16, wherein the determining the type 1 damage comprises determining bias temperature instability damage and determining the type 2 damage comprises determining hot carrier injection damage.

* * * * *